(12) United States Patent
Wakely et al.

(10) Patent No.: US 10,122,850 B2
(45) Date of Patent: Nov. 6, 2018

(54) SUPPORT OF NON-SECURE WARNING TONES ON PACKET-SWITCHED NETWORKS, PARTICULARLY ACROSS MULTIPLE SECURITY DOMAINS

(71) Applicant: Paradigm Services Limited, London (GB)

(72) Inventors: Christopher Benjamin Wakely, Hertfordshire (GB); Kevin John Warbrick, Hertfordshire (GB)

(73) Assignee: Paradigm Services Limited, London (GB)

( * ) Notice: Subject to any disclaimer, the term of this patent is extended or adjusted under 35 U.S.C. 154(b) by 853 days.

(21) Appl. No.: 14/267,442

(22) Filed: May 1, 2014

(65) Prior Publication Data
US 2014/0328339 A1 Nov. 6, 2014

(30) Foreign Application Priority Data
May 2, 2013 (EP) .................................... 13002336

(51) Int. Cl.
*H04L 29/06* (2006.01)
*H04M 3/436* (2006.01)
*H04M 3/20* (2006.01)
*H04M 7/00* (2006.01)

(52) U.S. Cl.
CPC ............ *H04M 3/436* (2013.01); *H04L 63/14* (2013.01); *H04L 65/103* (2013.01); *H04L 65/104* (2013.01); *H04L 65/1069* (2013.01); *H04M 3/205* (2013.01); *H04M 7/0078* (2013.01); *H04L 63/105* (2013.01)

(58) Field of Classification Search
CPC ..... H04L 63/14; H04L 65/103; H04L 65/104; H04L 65/1069; H04L 63/105; H04M 3/205; H04M 3/436; H04M 7/0078

USPC .......................................... 370/351, 356, 525
See application file for complete search history.

(56) References Cited

U.S. PATENT DOCUMENTS

| | | | |
|---|---|---|---|
| 6,735,291 B1 * | 5/2004 | Schmid ............... | H04L 63/0218 379/189 |
| 2008/0141331 A1 * | 6/2008 | Tasker ................ | H04L 63/0428 726/1 |
| 2010/0111276 A1 * | 5/2010 | Hartley ................. | H04L 63/102 379/142.05 |

FOREIGN PATENT DOCUMENTS

| | | |
|---|---|---|
| EP | 1 244 322 A1 | 9/2002 |
| WO | WO 2012/110818 A1 | 8/2012 |
| WO | WO 2012110818 A1 * | 8/2012 ......... H04L 63/0227 |

OTHER PUBLICATIONS

European Search Report dated Oct. 29, 2013 (8 pages).

* cited by examiner

*Primary Examiner* — Mark H Rinehart
*Assistant Examiner* — Natali Pascual Peguero
(74) *Attorney, Agent, or Firm* — Crowell & Moring LLP

(57) ABSTRACT

A method for supporting non-secure warning tones on packet-switched networks involves receiving a call attempt from a source phone to a destination phone, checking if a connection of the security domains of the source phone and the destination phone via a MLS voice gateway is allowed, and checking if a generation of a non-secure warning tone locally by the source phone is required. A call is established from the source phone to the destination phone upon acknowledgement of the local generation of the non-secure warning tone by the source phone.

15 Claims, 7 Drawing Sheets

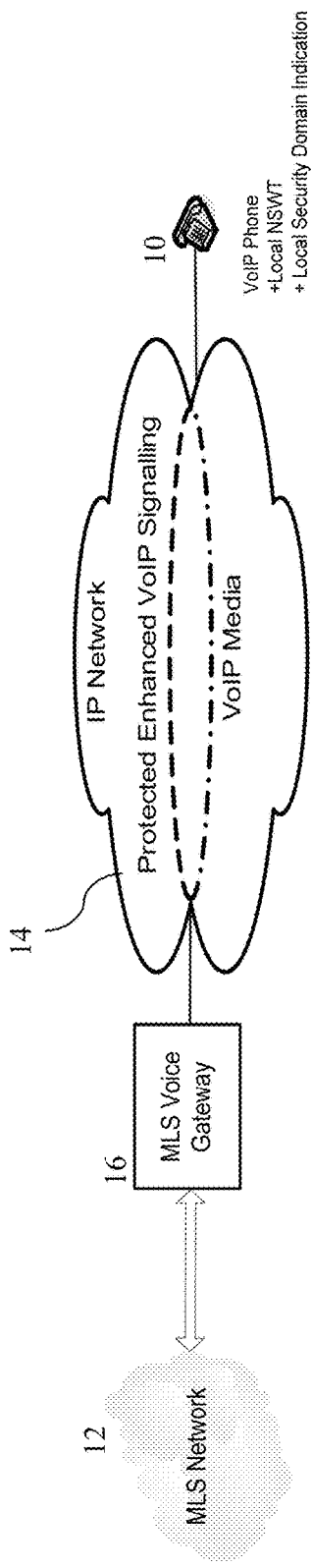
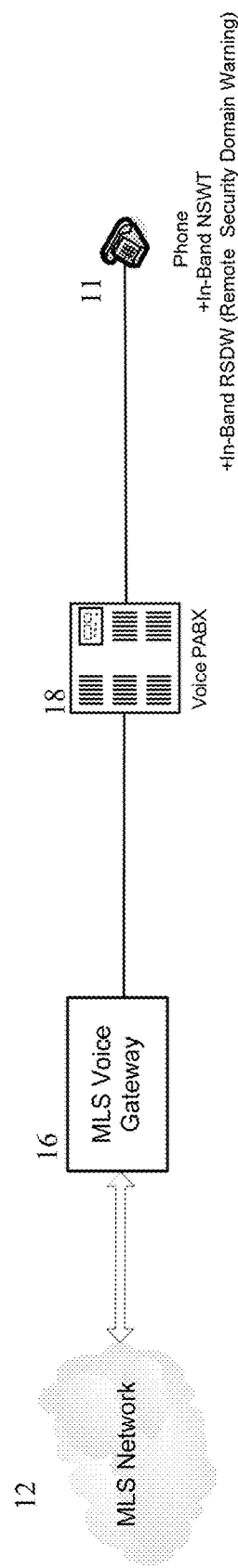

SUPPORT OF NON-SECURE WARNING TONES ON PACKET-SWITCHED NETWORKS, PARTICULARLY ACROSS MULTIPLE SECURITY DOMAINS

TECHNICAL FIELD

The invention relates to improving the support of non-secure warning tones on packet-switched networks, particularly across multiple security domains.

BACKGROUND

A Non-Secure Warning Tone (NSWT) is used in telephone calls to signal that a party of the call is non-trusted. The NSWT is applied to a voice signal of a telephone or voice call in order to be audible. A Multi-Level Secure (MLS) system is used for allowing secure communication between different security domains, for example secure and Non-Secure, and to use NSWTs to signal non-trusted parties in telephone communications. Particularly, MLS voice gateway can provide handling of voice calls between any combination of VoIP (Voice over Internet Protocol) and Circuit switched voice phones in different security domains.

The standard way of supporting NSWT is for the MLS system to issue the NSWT in-band. This method of supporting NSWT has critical limitations in VoIP systems, as it is essential that the NSWT is never lost, or degraded as to be unintelligible, which normally means the VoIP call must be kept at 64 kbps PCM, which has substantial bandwidth implications. It also means that the call must not be allowed to route out of the initial IP network into other attached IP networks, unless it can also be ensured that the NSWT will not be lost.

In the following, several of critical limitations issuance of the NSWT for the MLS system in-band are briefly explained:
- It can never guarantee that the NSWT is always clearly audible on the VoIP phone.
- It is highly reliant on the quality of the voice codec in order to minimize any possibility of the NSWT not being clearly audible. This will normally mean that it must use a high bandwidth codec, e.g. G.711/64 kbps, which clearly has substantial bandwidth implications.
- It is essential that the routing of the VoIP call is controlled, and that the destination VoIP phone is on the same IP network, so as to minimize the possibility of the NSWT not being clearly audible.
- It is affected by any degradation in the voice quality of the VoIP call, whether caused by multiple voice transcodes, or by packet delay or loss, as it is essential that the voice quality of the VoIP call is always keep high, so as to minimize the possibility of the NSWT not being clearly audible.

A further problem is described in the following. In the past a NSWT has only been required to distinguish between two security domains, Secure and Non-secure, when operating in MLS mode. When it is necessary to support multiple security domains, e.g. in a Coalition, the single NSWT is no longer sufficient to ensure that the calling, or called, subscriber is fully informed as to what security domain the called, or calling, subscriber is in.

The standard way, when operating in MLS mode, to distinguish between multiple security domains is to just use a NSWT to distinguish between the multiple security domains, however this suffers from several key limitations:
- It cannot guarantee that the security domain of a remote phone is clearly known to the called, or calling, subscriber.
- It has a finite limit on the number of different security domains that can be supported, because as this number increases, this method of security warning rapidly becomes ambiguous and confusing.

SUMMARY OF INVENTION

Therefore, exemplary embodiments of the present invention are directed to improving the support of non-secure warning tones on packet-switched networks, particularly across multiple security domains.

The problem addressed by the invention is how to effectively support the generation of NSWT on VoIP phones, and to overcome the following limitations with issuing the NSWT in-band. The solution according to the invention is that the signaling, particularly the VoIP signaling is enhanced between a MLS system and a phone, particularly a VoIP device to include the signaling of NSWT, which would then be generated locally by an enhanced (VoIP) phone. Thus, the invention ensures that the NSWT is always clearly audible on the phone, whereas issuing the NSWT in-band can never guarantee this. The invention places no restriction on the voice codec, and its associated bandwidth used to support the VoIP call, whereas issuing the NSWT in-band is highly reliant on the quality of voice codec in order to minimize any possibility of the NSWT not being clearly audible. The invention is unaffected by the routing of a (VoIP) call and whether a destination (VoIP) phone is on the same, or on a different connected packet-switched, particularly IP network, whereas with the current method of issuing the NSWT in-band it is essential that the routing of a VoIP call is controlled, and that a destination VoIP phone is on the same IP network, so as to minimize the possibility of the NSWT not being clearly audible. The invention is unaffected by any degradation in the voice quality of the VoIP call, whether caused by multiple voice transcodes, or by packet delay or loss, whereas with the current method of issuing the NSWT in-band, it is essential that the voice quality of the VoIP call is always keep high.

A further problem addressed by embodiments of the invention of is how to distinguish between multiple security domains on both VoIP, and Circuit Switched phones, when operating in MLS mode, and to overcome the key limitation with the current approach, which is to use NSWT, as a non-domain specific tone. Embodiments of the invention can ensure that the security domain of a remote phone is always unambiguous, whereas the current method of using NSWT, as a non-domain specific tone, cannot distinguish between multiple security domains. The invention has no limit on the number of different security domains supported, whereas just using NSWT, as the method of security warning, does not accurately inform the user of the security requirements of the voice connection. Embodiments of the invention may support 'NSWT' across multiple security domains, may have no constraint on the number of different security domains supported, may have a mode of operation compatible with standard circuit switched phones, may have a mode of operation compatible with ruggedized display-less VoIP phones, may place no requirements on the voice codec, and its associated bandwidth, used to support the VoIP call, and may be unaffected by any degradation in the voice quality of the VoIP call, whether caused by multiple voice transcodes, or by packet delay or loss.

An embodiment of the invention relates to a method for supporting non-secure warning tones on packet-switched networks comprising the steps of receiving a call attempt from a source phone to a destination phone, checking if a connection of the security domains of the source phone and the destination phone via a MLS voice gateway is allowed, checking if a generation of a non-secure warning tone locally by the source phone is required, and establishing a call from the source phone to the destination phone upon acknowledgement of the local generation of the non-secure warning tone by the source phone. This embodiment establishes an enhanced signaling between a MLS voice gateway and a phone for supporting non-secure warning tone generation.

The step of checking if a connection of the security domains of the source phone and the destination phone via a MLS voice gateway is allowed can comprise the following steps: checking if the security domains of the source phone and the destination phone are compatible, and terminating the call attempt if the security domains are not compatible. For checking compatibility, the MLS voice gateway can use a compatibility table containing data for the allowed connections between different security domains and the requirements of generating warning tones depending on the connection of different security domains.

The step of checking if a generation of a non-secure warning tone locally by the source phone is required can comprise the following steps: checking if a warning is required for connecting the security domains of the source phone and the destination phone via a MLS voice gateway, and if a warning is required, signaling to the source phone that a local generation of a non-secure warning tone is required and waiting for an acknowledgment of the local generation of a non-secure warning tone locally by the source phone. Thus, it can be ensured that only phones being able to locally generate non-secure warning tones will be allowed to establish a call with the destination phone.

The step of checking if a generation of a non-secure warning tone locally by the source phone is required can comprise the following steps: checking if a warning is required for connecting the security domains of the source phone and the destination phone via a MLS voice gateway, and if a warning is required, generating an In-Band non-secure warning tone by the MLS voice gateway. This also allows establishing calls from Circuit Switched phones, which can only process In-Band non-secure warning tones. The method can further comprise the step of generating an In-Band remote security domain warning by the MLS voice gateway if a warning is required. Thus, a further warning can be generated informing a caller about a different remote security domain, either audible or visible.

A further embodiment of the invention relates to a MLS voice gateway for establishing a call between a source phone and a destination phone over a packet-switched network comprising means for receiving a call attempt from a source phone to a destination phone, means for checking if a connection of the security domains of the source phone and the destination phone via a MLS voice gateway is allowed, means for checking if a generation of a non-secure warning tone locally by the source phone is required, and means for establishing a call from the source phone to the destination phone upon acknowledgement of the local generation of the non-secure warning tone by the source phone.

The means for checking if a connection of the security domains of the source phone and the destination phone via a MLS voice gateway is allowed can be further adapted to perform a method of the invention and as described above, and/or the means for checking if a generation of a non-secure warning tone locally by the source phone is required can be further adapted to perform a method of the invention and as described above.

A further embodiment of the invention relates to a computer program, which implements a method according to the invention and as described herein and supporting non-secure warning tones on packet-switched networks when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

Another embodiment of the invention relates to a computer being configured by a computer program of the invention and as described above for implementing the support non-secure warning tones on packet-switched networks.

A yet further embodiment of the invention relates to a phone being adapted to support non-secure warning tones on packet-switched networks and to establish calls over a MLS voice gateway of the invention and as described above, the phone being further adapted to acknowledge generating a non-secure warning tone to the MLS voice gateway upon receipt of a corresponding signaling from the MLS voice gateway.

These and other aspects of the invention will be apparent from and elucidated with reference to the embodiments described hereinafter.

The invention will be described in more detail hereinafter with reference to exemplary embodiments. However, the invention is not limited to these exemplary embodiments.

BRIEF DESCRIPTION OF DRAWINGS

FIG. 1 shows a MLS VoIP phone providing local NSWT and RSDW according to the invention connected with a MLS voice gateway via an IP network;

FIG. 2 shows a Circuit Switched phone according to the invention connected with a MLS voice gateway, providing NSWT and RSDW in-band, via a Voice PABX;

DETAILED DESCRIPTION

Figure 3:
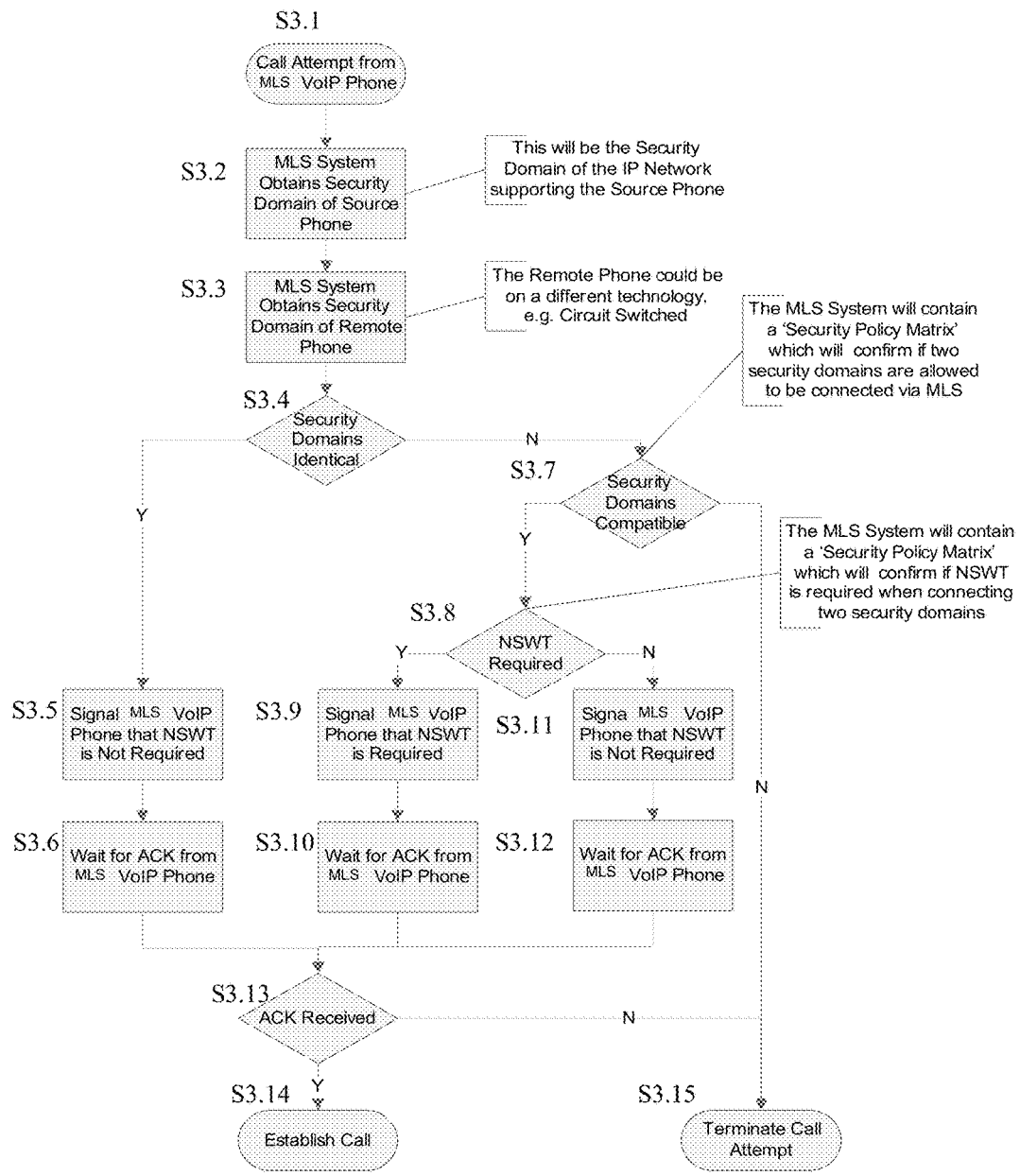
FIG. 3 shows a flow chart of a first embodiment of a method for a call setup from a MLS VoIP phone providing local NSWT according to the invention.

In the following, functionally similar or identical elements may have the same reference numerals. In the flow charts of FIGS. 3 to 8, the term MLS system is used as synonym for MLS voice gateway.

The outline of the operation of NSWT Support on IP Networks according to the invention is as follows: On activation a MLS VoIP phone shall establish a security association with a MLS voice gateway. FIG. 1 shows the basic connectivity between the MLS VoIP phone 10 and the MLS network via the MLS voice gateway 16. This security association will offer protection to signaling flows between the MLS VoIP phone 10 and the MLS voice gateway 16, where the level of protection is defined by the implementation of the 'MLS' VoIP phone 10. However, the connection between the MLS voice gateway 16 and the MLS VoIP phone 10 must be on a suitable secure IP network 14. This action will identify this as a MLS VoIP phone 10 supporting MLS capabilities. The specific details, e.g. IP address, to be used by the MLS VoIP phone 10 to allow it to establish this security association will either be preconfigured in the MLS VoIP phone 10, or requested by the MLS VoIP phone 10 on activation. The 'MLS' VoIP phone 10 could be designed to support multiple MLS voice gateways 16 into the MLS network 12, to allow it to be fully resilient against partial network failures.

The flow chart shown in FIG. 3 outlines a call setup from the MLS VoIP phone 10 starting with a call attempt (step S3.1). The fundamental stages as follows: Obtain the security domains of the source and destination phones (steps S3.2, 3.3). Check if the security domains are the same (step S3.4), if so establish the call signaling that no NSWT shall be generated by the MLS VoIP phone (step S3.5) and wait for acknowledgment ACK of the MLS VoIP phone (step S3.6). Check if ACK is received (step S3.13), if so establish a call (step S3.14). If the security domains are not the same (step S3.4), then check the 'Security Policy Matrix' to confirm that the security domains are allowed to be connected (step S3.7). If they are allowed to connect, check the 'Security Policy Matrix' to confirm if NSWT shall be generated locally by the MLS VoIP phone (step S3.8). If a NSWT is required, signal to the MLS VoIP phone that the NSWT is required (step S3.9), then wait for acknowledgment ACK of the MLS VoIP phone (step S3.10). Check if ACK is received (step S3.13), if so establish a call (step S3.14). If no NSWT is required, signal to the MLS VoIP phone that the NSWT is not required (step S3.11), then wait for acknowledgment ACK of the MLS VoIP phone (step S3.12). Check if ACK is received (step S3.13), if so establish a call (step S3.14). If ACK is not received or security domains are not allowed to be connected (step S3.7), terminate call attempt (step S3.15).

The 'MLS' VoIP phone must always be connected to a secure IP network for its MLS functionality to operate, as by definition MLS is a 'Secure High' system, with the user being appropriately warned of a call to a different security domain.

Figure 4:
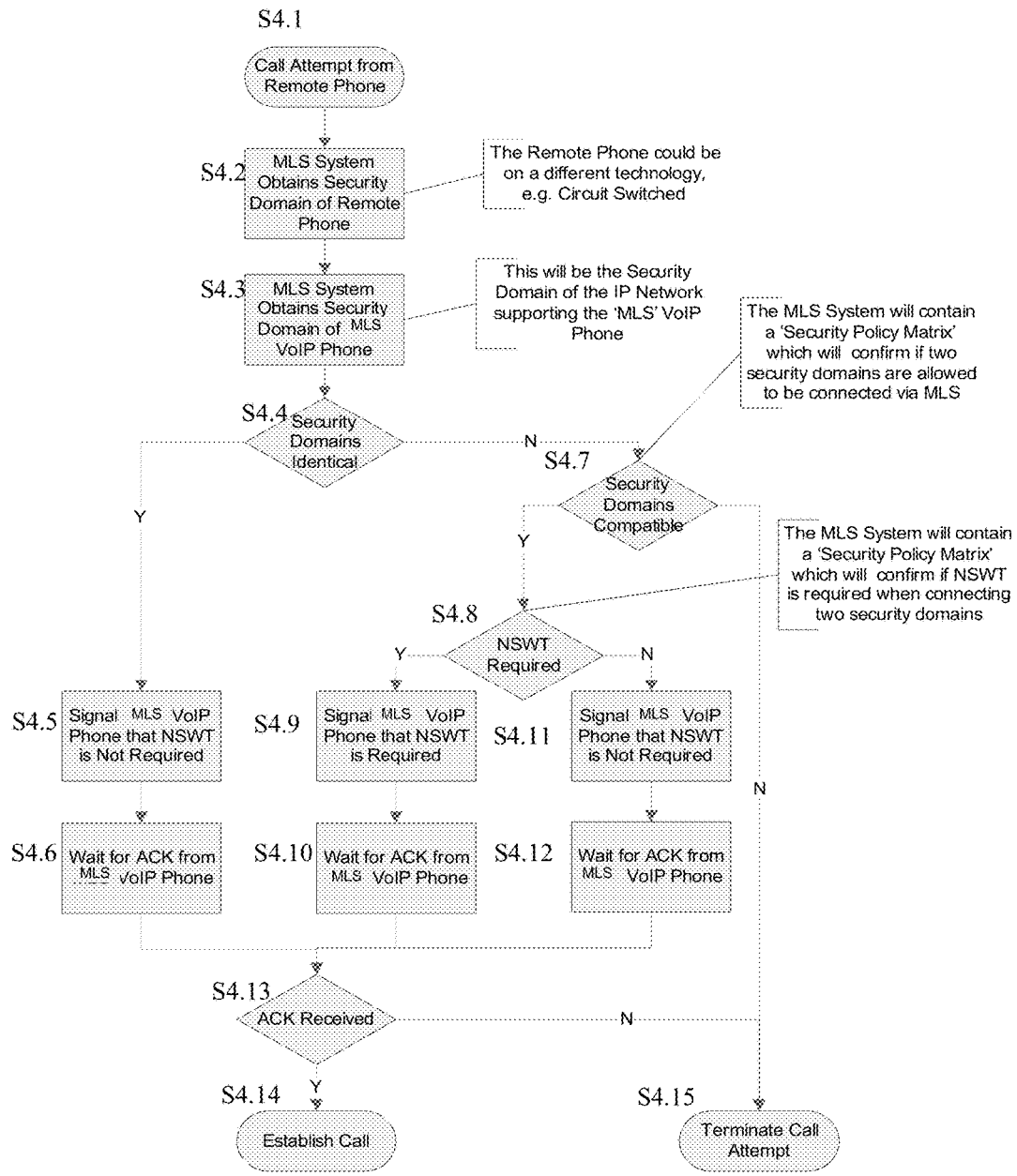
FIG. 4 shows a flow chart of a first embodiment of a method for a remote call setup to a MLS VoIP phone providing local NSWT according to the invention.

The flow chart shown in FIG. 4 outlines a remote call setup to the MLS VoIP phone 10. The basic stages are the same as for the flow chart of FIG. 3 with the only difference that in step S4.1 the call attempt comes from a remote phone device, which will not necessarily be a VoIP device; it could also be a Circuit Switched phone or another MLS VoIP phone.

The call setup method according the invention as described above has the following key advantages over prior technology: The method ensures that the NSWT is always clearly audible on the VoIP phone. The method places no requirements on the voice codec, and its associated bandwidth, used to support the VoIP call. The method is unaffected by the routing of the VoIP call and whether the destination VoIP phone is on the same, or on a different connected IP network. The method is unaffected by any degradation in the voice quality of the VoIP call, whether caused by multiple voice transcodings, or by packet delay or loss.

Next, an embodiment of the invention supporting Non-Secure Warning Tones (NSWT) on IP Networks across Multiple Security Domains is described.

According to this embodiment, NSWT is combined with a new Remote Security Domain Warning (RSDW) which is implemented as an audible warning, for example a message, or as a visual warning, for example a message displayed on a device's display, or both. The NSWT then functions as a reminder to the local subscriber that the remote subscriber is in another security domain/caveat, with the RSDW providing full details of this remote security domain/caveat.

When implemented on a VoIP device, the RSDW can be signalled using enhanced VoIP signaling between a MLS system and the VoIP device, which will then locally generate the RSDW as either an audible message, or as a warning on its display, or both. When implemented on a Circuit Switched phone, the RSDW audible warning message can be generated by the MLS voice gateway in-band with the call to the phone, this ensures that this solution will not place any special constraints on the Circuit Switched phone, or system. This will maintain interoperability with the existing Circuit Switched technology that will continue to be a standard military technology, during the migration to VoIP.

The outline of the operation of NSWT support across multiple security domains according to the invention is as follows: On activation a MLS VoIP phone shall establish a security association with the MLS voice gateway. FIG. 1 shows the basic connectivity between the MLS VoIP phone 10 and the MLS voice gateway 16. This security association will offer protection to signalling flows between the MLS VoIP phone 10 and the MLS voice gateway 16, where the level of protection is defined by the implementation of the MLS VoIP phone 10. However, the connection between the MLS voice gateway 16 and the MLS VoIP phone 10 must be on a suitable secure IP network 14. This action will identify this as a MLS VoIP phone 10 supporting MLS capabilities, which will include the method by which the phone supports RSDW, e.g. audible warning, or visual warning, or both. The specific details, e.g. IP address, to be used by the MLS VoIP phone 10 to allow it to establish this security association will either be preconfigured in the MLS VoIP phone 10, or requested by the MLS VoIP phone 10 on activation. The MLS VoIP phone 10 could be designed to support multiple MLS voice gateways 16 into the MLS network 12, to allow it to be fully resilient against partial network failures. FIG. 2 shows the basic connectivity between a Circuit Switched phone 11 and the MLS voice gateway 16 via a Voice PABX 18. For a Circuit Switched phone to be given 'MLS' capabilities, the MLS voice gateway shall need to be configured to support this. For example this could be controlled using the CLI (Calling Line Identity) of the Circuit Switched phone.

Figure 5:
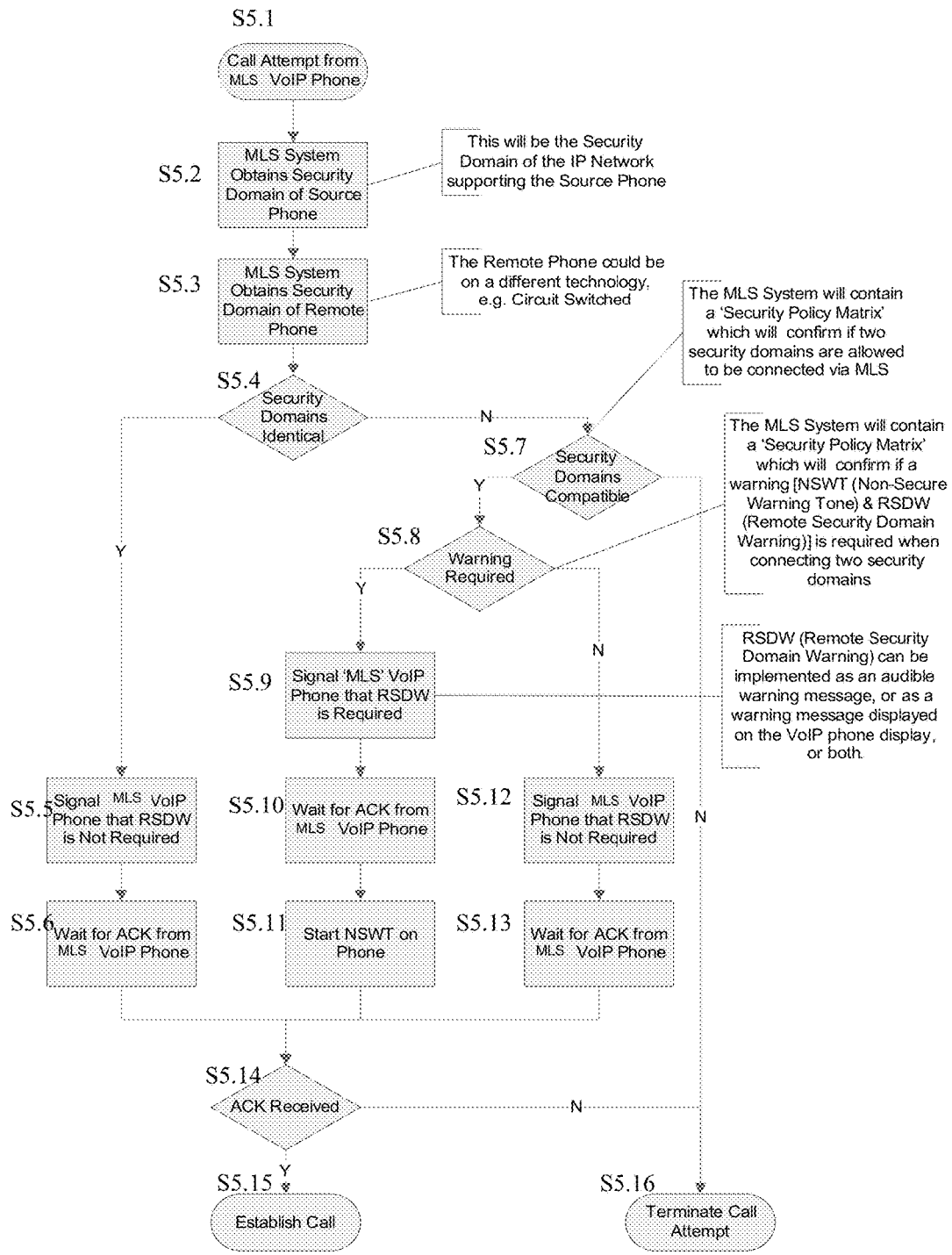
FIG. 5 shows a flow chart of a second embodiment of a method for a call setup from a MLS VoIP phone providing local NSWT and RSDW according to the invention.

The flow chart of FIG. 5 outlines a call setup from a MLS VoIP phone 10 starting with a call attempt (step S5.1). The fundamental stages are as follows: Obtain the security domains of the source and destination phones (steps S5.2, 5.3). Check if the security domains are the same (step S5.4), if so establish the call signaling that no RSDW shall be generated by the MLS VoIP phone (step S5.5) and wait for acknowledgment ACK of the MLS VoIP phone (step S5.6). Check if ACK is received (step S5.14), if so establish a call (step S5.15). If the security domains are not the same (step S5.4), then check the 'Security Policy Matrix' to confirm that the security domains are allowed to be connected (step S5.7). If they are allowed to connect, check the 'Security Policy Matrix' to confirm if RSDW shall be generated locally by the MLS VoIP phone (step S5.8). If a RDSW is required, signal to the MLS VoIP phone that the RSDW is required (step S5.9), then wait for acknowledgment ACK of the MLS VoIP phone (step S5.10) and thereafter start NSWT on the phone (step S5.11). Check if ACK is received (step S5.14), if so establish a call (step S5.15). If no RSDW is required, signal to the MLS VoIP phone that the RSDW is not required (step S5.12), then wait for acknowledgment ACK of the MLS VoIP phone (step S5.13). Check if ACK is received (step S5.14), if so establish a call (step S5.15). If ACK is not received or security domains are not allowed to be connected (step S5.7), terminate call attempt (step S5.16).

The MLS VoIP phone must always be connected to a secure IP network for its MLS functionality to operate, as by definition MLS is a 'Secure High' system, with the user being appropriately warned of a call to a different security domain.

Figure 6:
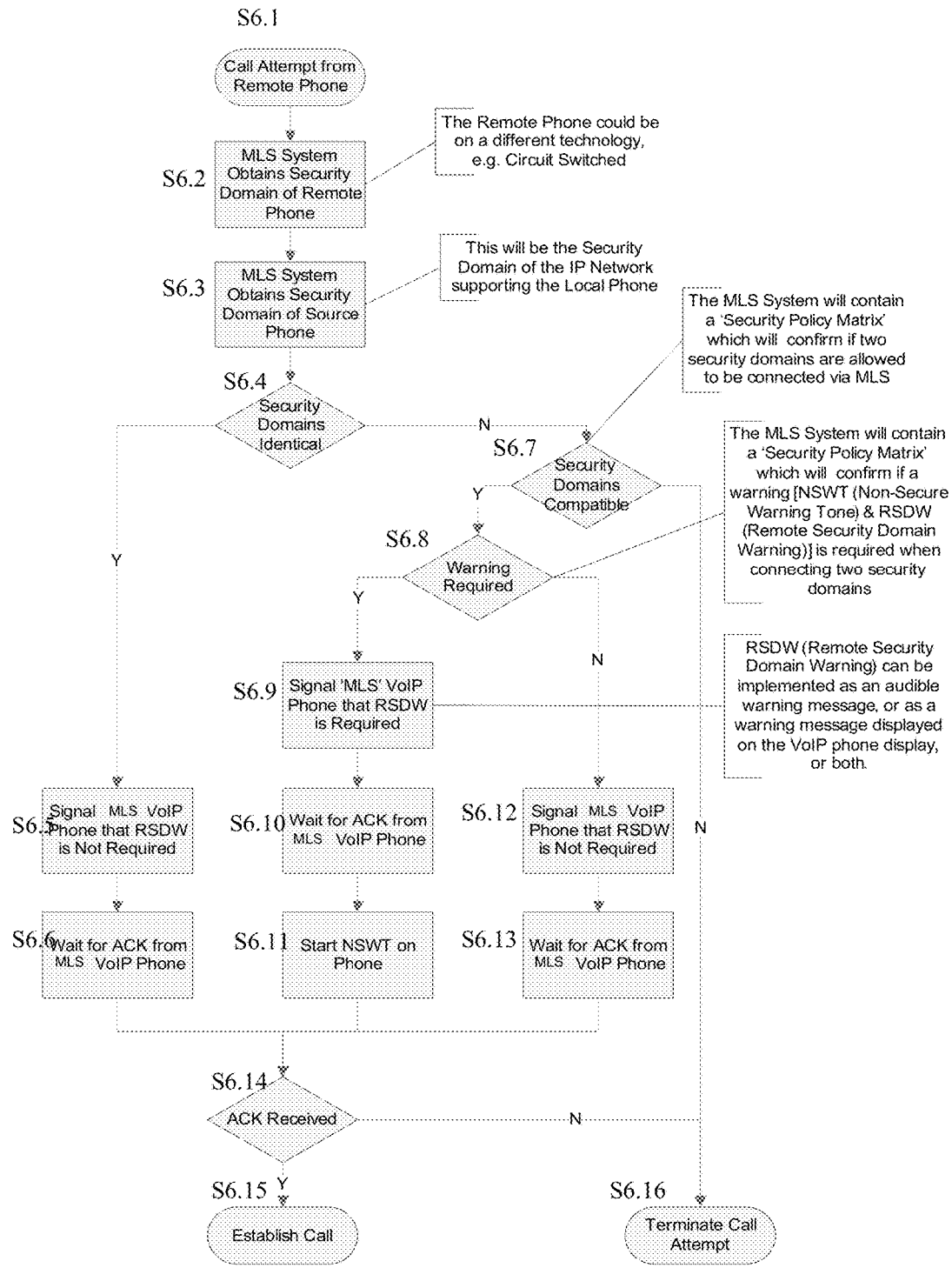
FIG. 6 shows a flow chart of a second embodiment of a method for a remote call setup to a MLS VoIP phone providing local NSWT and RSDW according to the invention.

The flow chart shown in FIG. 6 outlines a remote call setup to the MLS VoIP phone 10. The basic stages are the same as for the flow chart of FIG. 5 with the only difference that in step S6.1 the call attempt comes from a remote phone device, which will not necessarily be a VoIP device; it could also be a Circuit Switched phone or another MLS VoIP phone.

Figure 7:
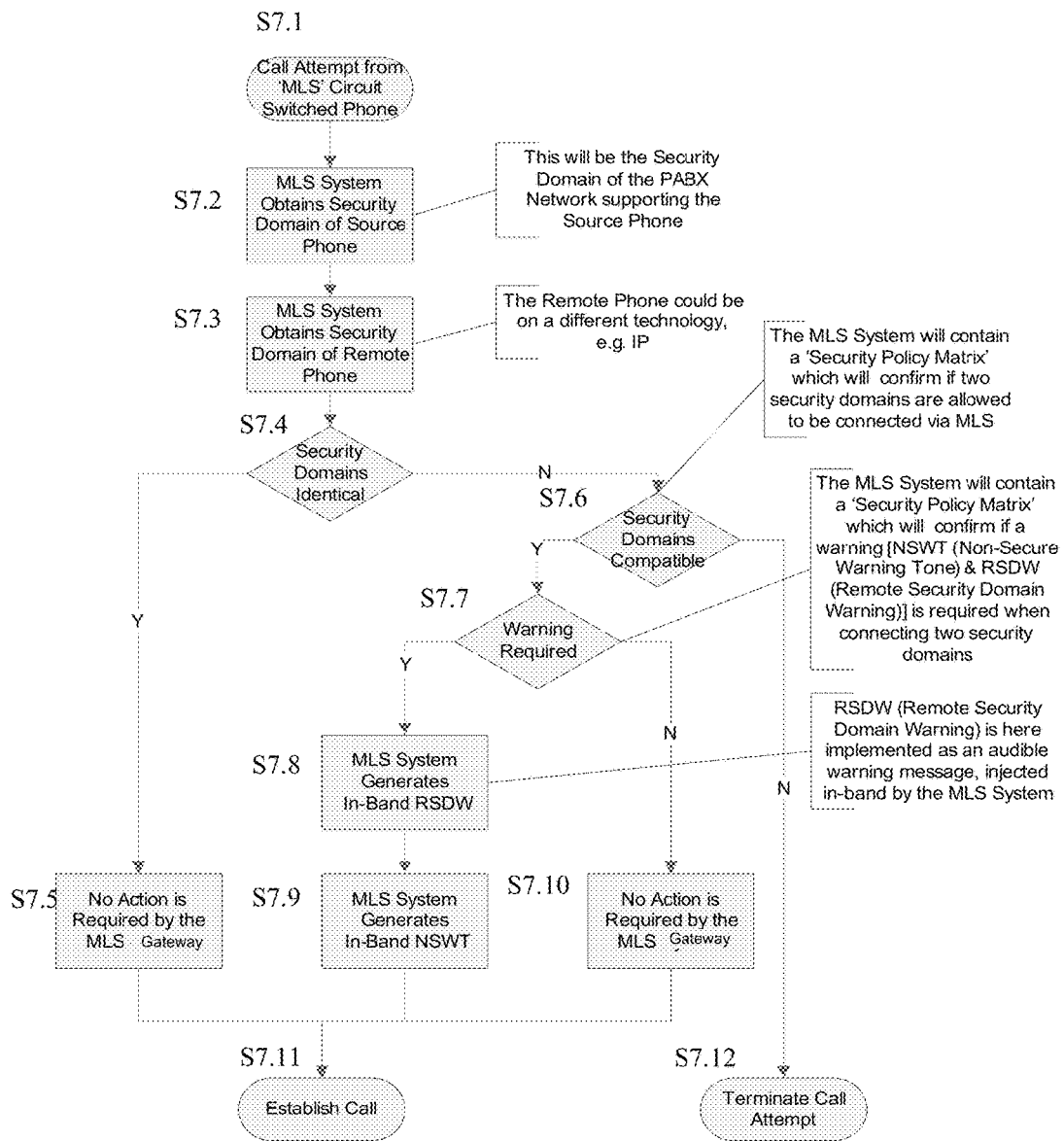
FIG. 7 shows a flow chart of an embodiment of a method for a call setup from a 'MLS' Circuit Switched phone with the MLS voice gateway providing the in-band NSWT and RSDW according to the invention.

The flow chart of FIG. 7 outlines a call setup from a 'MLS' Circuit Switched phone 11 starting with a call attempt (step S7.1). The fundamental stages are as follows: Obtain the security domains of the source and destination phones (steps S7.2, 7.3). Check if the security domains are the same (step S7.4), if so no action is required by the MLS voice gateway (step S7.5) and establish a call (step S7.11). If the security domains are not the same (step S7.4), then check the 'Security Policy Matrix' to confirm that the security domains are allowed to be connected (step S7.6). If they are allowed to connect, check the 'Security Policy Matrix' to confirm if RSDW shall be generated as an audible warning message, injected in-band by the MLS voice gateway (step S7.7). If a RDSW is required, the MLS voice gateway generates an in-band RSDW (step S7.8) and thereafter an in-band NSWT (step S7.9) before a call is established (step S7.11). If no RSDW is required, no action is required by the MLS voice gateway (step S7.10), then a call is established (step S7.11). If the security domains are not allowed to be connected (step S7.6), terminate call attempt (step S7.12).

The 'MLS' Circuit Switched phone must always be connected to a secure Circuit Switched network for its MLS functionality to operate, as by definition MLS is a 'Secure High' system, with the user being appropriately warned of a call to a different security domain.

Figure 8:
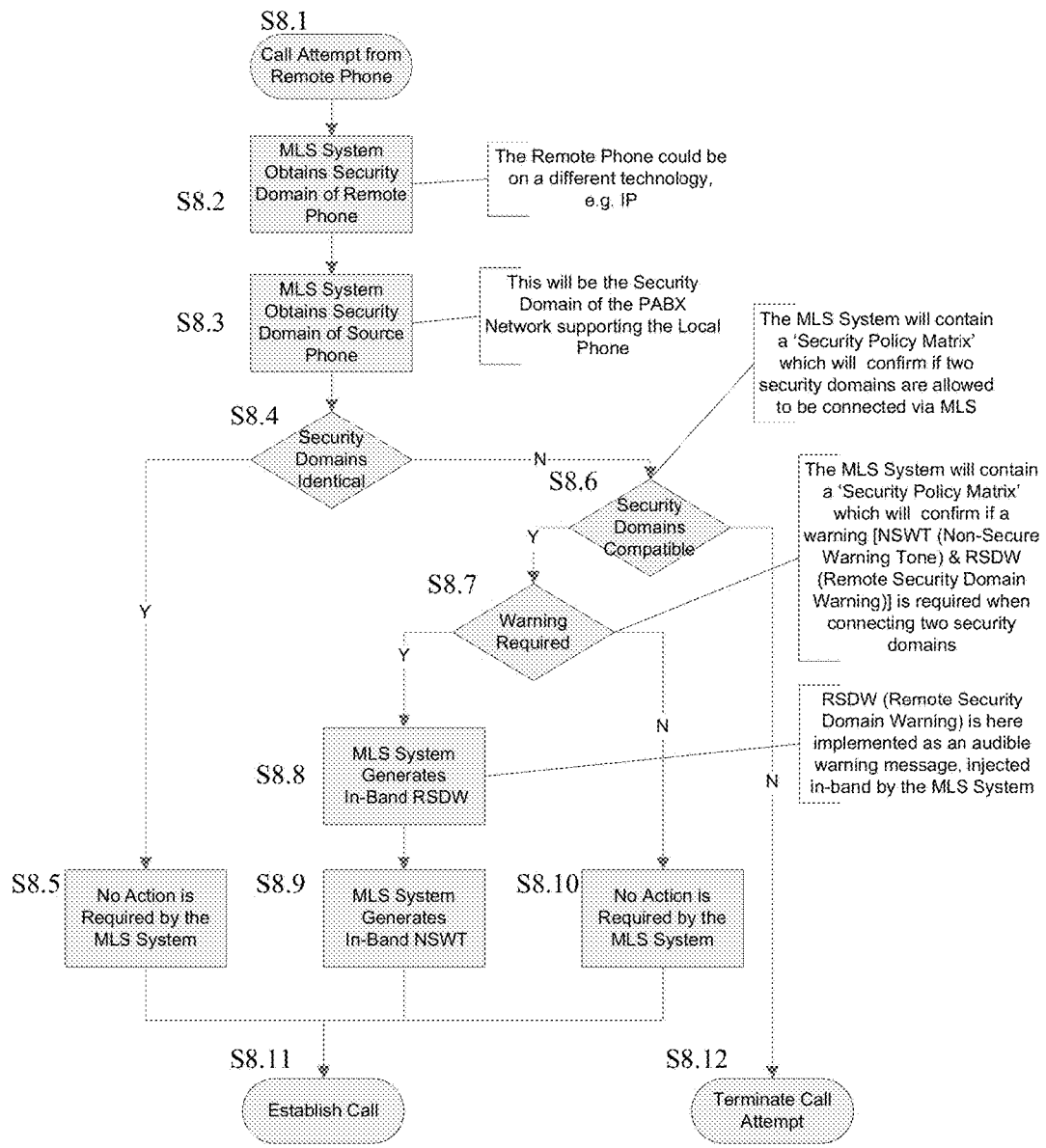
FIG. 8 shows a flow chart of an embodiment of a method for a remote call setup to a 'MLS' Circuit Switched phone with the MLS voice gateway providing the in-band NSWT and RSDW according to the invention.

The flow chart of FIG. 8 outlines a remote call setup to the 'MLS' Circuit Switched phone 11. The basic stages are the same as for the flow chart of FIG. 7 with the only difference that in step S8.1 the call attempt comes from a remote phone device, which will not necessarily be a VoIP device; it could also be a Circuit Switched phone or another MLS VoIP phone.

The method supporting Non-Secure Warning Tones on IP Networks across Multiple Security Domains according to the invention and as described above has the following key advantages over prior technology: The method supports NSWT across multiple security domains. The method has no limit on the number of different security domains supported. The method may have a mode of operation compatible with standard circuit switched phones. The method may have a mode of operation compatible with ruggedized display-less VoIP phones. The method places no requirements on the voice codec, and its associated bandwidth, used to support the VoIP call. The method is unaffected by any degradation in the voice quality of the VoIP call.

REFERENCE NUMERALS AND ACRONYMS

10 MLS VoIP phone
11 MLS Circuit Switched phone
12 MLS Network
14 IP network
16 MLS voice gateway
18 Voice PABX
IP Internet Protocol
MLS Multi-Level Secure
NSWT Non-Secure Warning Tone
PABX Private Automatic Branch Exchange
PCM Pulse Code Modulation
RSDW Remote Security Domain Warning
VoIP Voice over IP

What is claimed is:

1. A method for supporting non-secure warning tones on packet-switched networks comprising the steps of:
   receiving, by a Multi-Level Secure (MLS) voice gateway, a call attempt from a source phone to a destination phone;
   checking, by the MLS voice gateway, if a connection of security domains of the source phone and the destination phone via the MLS voice gateway is allowed;
   checking, by the MLS voice gateway, if a generation of a non-secure warning tone locally by the source phone is required;
   receiving, by the MLS voice gateway, an acknowledgement of a local generation of the non-secure warning tone by the source phone; and
   establishing, by the MLS voice gateway, a cross-security domain call from the source phone to the destination phone.

2. The method of claim 1, wherein the step of checking if the connection of the security domains of the source phone and the destination phone via a MLS voice gateway is allowed comprises the steps of:
   checking if the security domains of the source phone and the destination phone are compatible; and
   allowing the call attempt based on the step of checking if the security domains of the source phone and the destination phone are compatible.

3. The method of claim 1, wherein the step of checking if a generation of a non-secure warning tone locally by the source phone is required comprises the steps of:
   checking if a warning is required for connecting the security domains of the source phone and the destination phone via a MLS voice gateway; and
   signaling to the source phone that the local generation of the non-secure warning tone is required,
   and waiting for the acknowledgment of the local generation of the non-secure warning tone locally by the source phone.

4. The method of claim 1, wherein the step of checking if a generation of a non-secure warning tone locally by the source phone is required comprises the steps of:
   checking if a warning is required for connecting the security domains of the source phone and the destination phone via a MLS voice gateway; and generating an In-Band non-secure warning tone by the MLS voice gateway.

5. The method of claim 4, further comprising the step of: generating an in-band remote security domain warning by the MLS voice gateway.

6. A Multi-Level Secure (MLS) voice gateway for establishing a call between a source phone and a destination phone over a packet-switched network comprising:
means for receiving a call attempt from the source phone to the destination phone;
means for checking if a connection of security domains of the source phone and the destination phone via the MLS voice gateway is allowed;
means for checking if a generation of a non-secure warning tone locally by the source phone is required;
means for receiving an acknowledgement of a local generation of the non-secure warning tone by the source phone; and
means for establishing a call from the source phone to the destination phone when the acknowledgement of the local generation of the non-secure warning tone by the source phone is received.

7. The MLS voice gateway of claim 6, wherein the means for checking if a connection of the security domains of the source phone and the destination phone via a MLS voice gateway is allowed are further adapted to check if the security domains of the source phone and the destination phone are compatible, and allow the call attempt based on compatibility of the security domains of the source phone and the destination phone.

8. The MLS voice gateway of claim 6, wherein the means for checking if a generation of a non-secure warning tone locally by the source phone is required are further adapted to check if a warning is required for connecting the security domains of the source phone and the destination phone via a MLS voice gateway, and signal to the source phone that the local generation of the non-secure warning tone is required and wait for the acknowledgment of the local generation of the non-secure warning tone locally by the source phone.

9. The MLS voice gateway of claim 6, wherein the means for checking if a generation of a non-secure warning tone locally by the source phone is required are further adapted to check if a warning is required for connecting the security domains of the source phone and the destination phone via a MLS voice gateway, and generate an In-Band non-secure warning tone by the MLS voice gateway.

10. The MLS voice gateway of claim 6, wherein the means for checking if a generation of a non-secure warning tone locally by the source phone is required are further adapted to generate an in-band remote security domain warning by the MLS voice gateway.

11. A non-transitory computer-readable medium including processor executable instructions, which when executed by a processor, causes the processor to:
receive a call attempt from a source phone to a destination phone;
check if a connection of security domains of the source phone and the destination phone via a Multi-Level Secure (MLS) voice gateway is allowed;
check if a generation of a non-secure warning tone locally by the source phone is required;
receive an acknowledgement of a local generation of the non-secure warning tone by the source phone; and
establish a call from the source phone to the destination phone.

12. The non-transitory computer-readable medium of claim 11, wherein the processor executable instructions for checking if the connection of the security domains of the source phone and the destination phone via a MLS voice gateway is allowed cause the processor to:
check if the security domains of the source phone and the destination phone are compatible; and
allow the call attempt based on compatibility of the security domains of the source phone and the destination phone.

13. The non-transitory computer-readable medium of claim 11, wherein the processor executable instructions for checking if a generation of a non-secure warning tone locally by the source phone is required cause the processor to:
check if a warning is required for connecting the security domains of the source phone and the destination phone via a MLS voice gateway; and
signal to the source phone that the local generation of the non-secure warning tone is required and wait for the acknowledgment of the local generation of the non-secure warning tone locally by the source phone.

14. The non-transitory computer-readable medium of claim 11, wherein the processor executable instructions for checking if a generation of a non-secure warning tone locally by the source phone is required cause the processor to:
check if a warning is required for connecting the security domains of the source phone and the destination phone via a MLS voice gateway; and
generate an In-Band non-secure warning tone by the MLS voice gateway.

15. The non-transitory computer-readable medium of claim 11, wherein the processor executable instructions further cause the processor to:
generate an in-band remote security domain warning by the MLS voice gateway.

* * * * *